United States Patent
Demming et al.

(10) Patent No.: US 6,219,998 B1
(45) Date of Patent: *Apr. 24, 2001

(54) METHOD OF SEALING TUBULAR OR BAG-SHAPED PACKAGING CASINGS AND SEALING DEVICE

(75) Inventors: Gerhard Demming, Bickenbach; Olaf Bienert, Waldems; Ortwin Ruschitschka, Buttelborn, all of (DE)

(73) Assignee: Poly-Clip System GmbH & Co. KG., Frankfurt am Main (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/159,171

(22) Filed: Sep. 23, 1998

(30) Foreign Application Priority Data

Sep. 24, 1997 (DE) .............................. 197 42 213

(51) Int. Cl.[7] ................................................ B65B 9/00
(52) U.S. Cl. .............................. 53/459; 53/417; 53/138.4; 53/567
(58) Field of Search ............................. 53/459, 567, 550, 53/417, 138.4

(56) References Cited

U.S. PATENT DOCUMENTS

| 3,324,621 | * | 6/1967 | Runge | 53/138.4 |
| 3,703,796 | * | 11/1972 | Inoue et al. | 53/138.4 |
| 4,675,945 | * | 6/1987 | Evans et al. | 53/138.4 |
| 5,113,635 | * | 5/1992 | Takai et al. | 53/138.4 |

* cited by examiner

Primary Examiner—Peter Vo
Assistant Examiner—Louis Huynh
(74) Attorney, Agent, or Firm—Norris Mclaughlin & Marcus

(57) ABSTRACT

This invention consists in a method of sealing tubular or bag-shaped packaging casings (10) filled with a tough filling, where the packaging casing (10) is first of all compressed to an adjustable degree, so that a pinched area (34) is produced, beside which a neck without filling is then produced by crimping the packaging casing (10), which neck is subsequently, if necessary, extended and sealed by setting two closure clips. The invention also consists in a sealing device comprising a crimping element (24, 26) and an additional clamping means (28, 30) for compressing the package beside the crimping element.

5 Claims, 1 Drawing Sheet

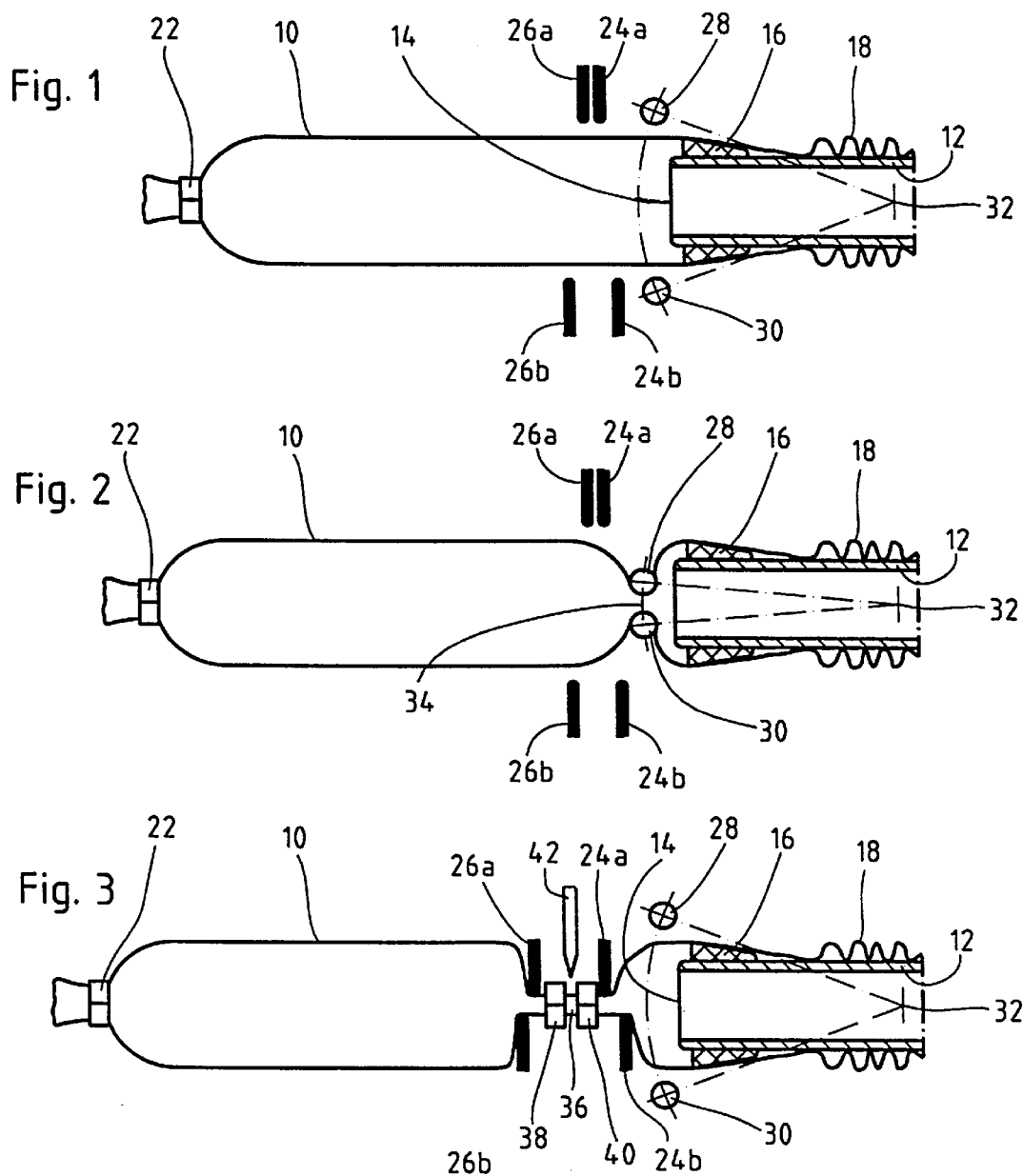

METHOD OF SEALING TUBULAR OR BAG-SHAPED PACKAGING CASINGS AND SEALING DEVICE

This invention relates to a method of sealing tubular or bag-shaped packaging casings filled with a tough filling, where a neck without filling is produced by crimping the packaging casing at a crimping point while at the same time displacing the filling disposed there, and by setting two closure clips. The invention also relates to a sealing device comprising a crimping element.

It is known to seal filled tubular or bag-shaped packaging casings by means of a crimping element. The crimping element usually is disposed behind the orifice of the filling tube of a filling machine. The packaging casing is sealed at one end and has been drawn onto the filling tube such that the sealed end of the packaging casing is disposed before the orifice of the filling tube.

For filling purposes, the filling is pressed through the filling tube into the packaging casing sealed at one end. In doing so, further packaging casing material is withdrawn from a reservoir on the filling tube. This withdrawal of packaging casing material from the reservoir on the filling tube is counteracted by a casing brake, which urges the packaging casing in the vicinity of the filling tube orifice onto the outer surface of the filling tube and retards the same in this way. The braking force of the casing brake, which upon filling the packaging casing must be overcome by the filling pressure, determines the height of the filling pressure.

When filling the packaging casing has been completed, the same must also be sealed at its second end. This is effected with the aid of a crimping element, which may constitute a crimping flap or a spreader-type crimping element comprising two crimping shears.

In the case of a spreader-type crimping element, the packaging casing to be sealed is crimped behind the orifice of the filling tube by two crimping shears first of all located directly beside each other, so that there is obtained a short neck without filling. Subsequently, the two crimping shears are spread apart for extending the neck without filling, i.e. the crimping shear remote from the filling tube is moved away from the crimping shear close to the filling tube in longitudinal direction of the filling tube. The two crimping shears are spread apart to such an extent that the resulting neck without filling is long enough to be sealed with two closure clips. After the closure clips have been set and closed, the neck can be cut through between the two closure clips. The packaging casing just filled is thus sealed at both ends, while the next packaging casing to be filled is sealed at its one end.

In the case of a crimping flap, it is superfluous to extend the neck upon crimping, since the crimping flap is so wide that it already crimps the neck upon sealing along a length which is sufficient for setting two closure clips.

In the case of a tough filling, e.g. sealing compounds, cements, bitumen, silicone, polyurethane and the like materials, the crimping element can crimp the filled packaging casing only with difficulty. In the case of a spreader-type crimping element it is just as difficult to subsequently spread the crimping shears for extending the neck without filling. In particular in the case of packaging casings with a diameter of more than 30 mm there is a risk that the packaging casing may get porous spots or even cracks upon crimping and spreading. Even if these are only very small injuries, air and moisture may penetrate through the same into the packaging casing, which depending on the type of filling may lead to the same getting hard. This is true in particular when the material for the packaging casing—as is often the case with such filling—consists of aluminum or a composite aluminum foil and is used as steam barrier. Even if in the case of the composite aluminum foil only the aluminum layer is damaged, air and moisture penetrate through the remaining plastic film, as the same does not form an adequate steam barrier.

To overcome the above disadvantages, it is known from DE-OS 38 11 421 to withdraw the filled packaging casing against the force of the casing brake before crimping the same by means of the crimping shears. There is obtained a pinched area behind the orifice of the filling tube, which facilitates the further crimping by means of the crimping shears and the spreading thereof. This prior art involves the disadvantage that the force required for withdrawing the filled packaging casing can be introduced into the packaging casing only with difficulty. When the withdrawal force is introduced for instance via the closure clip at the one sealed end of the packaging casing, there is a risk that the closure clip will be withdrawn from the packaging casing. In addition, there is a risk that the filling strand in the packaging casing will break uncontrolled at the crimping point. It is a further disadvantage that in the known method the diameter and the length of the pinched area very much depend on the viscosity of the filling.

It is therefore the object underlying the invention to eliminate as far as possible the disadvantages of the prior art by means of a novel method or a novel device.

In accordance with the invention this object is solved by a method as described above, where the packaging casing is compressed to an adjustable degree beside the crimping point prior to crimping. By compressing the filled packaging casing there is produced an area beside the crimping element, in which the packaging casing already has a smaller diameter has been pre-crimped so to speak—and which at the same time falls short of filling to an exactly controllable degree. Only after this compression is the packaging casing crimped to such an extent that a neck without filling is obtained, while at the same time displacing the filling disposed at the crimping point.

In accordance with a preferred aspect of the method, where the neck is produced by closing two crimping shears and is subsequently extended in that the one crimping shear is moved away from the second stationary crimping shear, the packaging casing is compressed beside the stationary crimping shear on its side facing away from the movable crimping shear, before the crimping shears are closed. This aspect of the method amounts to the fact that the filled packaging casing is compressed between the crimping shears and the orifice of the filling tube.

While compressing the packaging casing, additional packaging casing material is preferably withdrawn from a reservoir. In this way it is avoided that the packaging casing is excessively stretched upon compressing the same, as an excessive stretching might already lead to a damage of the packaging casing.

There is also preferred an aspect of the method according to which the packaging casing is released again after compressing and before crimping the same. This involves the great advantage that upon closing the crimping shears the filling can easily escape into that area of the packaging casing which has previously been compressed. Depending on the length and the degree of the compression of the packaging casing, this advantage will even be noted when spreading the crimping shears.

In accordance with the invention, the solution of the above object also consists in a sealing device as described above, which has an additional clamping means for compressing the package beside the crimping element. With such a sealing device, the inventive method can be performed with all its advantages.

The clamping means preferably has squeezing skids or squeezing rollers, which can be pressed onto the packaging casing. The shape of the squeezing skids or squeezing rollers determines the shape of the compressed packaging casing. This is in particular true for the length along which the packaging casing is compressed. When the squeezing rollers are rotatably supported, they have the further advantage that the withdrawal of additional packaging casing material during the compression is facilitated.

In the case of a sealing device disposed at the caster of the outlet of a filling machine, the squeezing skids or squeezing rollers can preferably be pressed onto the packaging casing between the filling machine and the crimping element.

The invention will now be explained in detail with reference to the drawing. FIGS. 1 to 3 of the drawing illustrate three stages of the inventive method when executing the same with a device in accordance with the invention, wherein:

FIG. 1 illustrates the filling operation;

FIG. 2 illustrates the compression of the packaging casing; and

FIG. 3 illustrates the completion of the sealing operation.

FIGS. 1 to 3 only represent the essential components of a filling machine and a sealing machine involved in filling and sealing a tubular packaging casing 10. On the part of the filling machine this is first of all a filling tube 12 with an orifice 14. In the vicinity of the orifice 14 a casing brake 16 has been pushed onto the filling tube.

With its open end, the packaging casing 10 sealed at one end with a closure clip 22 has been drawn over the surface of the filling tube 12 beyond the casing brake 16 and forms a caterpillar-shaped reservoir 18. For filling the packaging casing 10, the filling is pressed through the filling tube 12 into the packaging casing 10 sealed at one end, where packaging casing material is constantly withdrawn from the reservoir 18. The withdrawal of packaging casing material from the reservoir 18 is counteracted by the casing brake 16, so that for withdrawing packaging casing material a force is required which must be applied by the filling pressure when introducing the filling into the packaging casing 10.

As soon as the packaging casing 10 has been filled sufficiently, it must also be sealed at its second end. In accordance with the embodiment, this is effected by means of a spreader-type crimping element comprising two crimping shears 24 and 26, each consisting of an upper shear half 24a and 26a, respectively, and a lower shear half 24b and 26b, respectively. In addition, two squeezing rollers 28 and 30 are provided, which can be swivelled about a common pivot 32 and can be pressed onto the outside of the packaging casing 10. There is produced a pinched area 34 of the package, the degree of which can be adjusted via the swivelling angle of the squeezing rollers 28 and 30. When the squeezing rollers 28 and 30 are swivelled in, the packaging casing 10 is compressed. At the same time, the filling is displaced from the resulting pinched area 34, and packaging casing material is withdrawn from the reservoir 18, as for producing the pinched area 34 additional casing material is required. Withdrawing the additionally required packaging casing material is facilitated in that the squeezing rollers 28 and 30 can be rotated and can roll on the packaging casing 10. In this way, the load acting on the packaging casing 10 when compressing the same is very small. Finally, the pinched area 34 is disposed between the crimping shear 24 located close to the filling tube and the filling tube orifice 14. This condition is represented in FIG. 2.

Upon producing the pinched area 34, the squeezing rollers 28 and 30 are swivelled back to their original position. The pinched area 34 is maintained in general. In any case, the packaging casing 10 is slack and only loosely filled at the pinched area 34 after squeezing together and subsequently swivelling away the squeezing rollers 28 and 30. Now, the conditions have been created for the two crimping shears 24 and 26 slightly crimping the packaging casing 10 when closing the same. Upon closure, the two crimping shears 24 and 26 are located directly beside each other. By crimping the packaging casing 10 they produce a short neck without filling, whose length is not enough for sealing the same by setting two closure clips. Therefore, the crimping shears 24 and 26 are spread upon crimping, i.e. the pair of crimping shears 26 remote from the filling tube is axially moved away from the pair of crimping shears 24 closer to the filling tube in direction of the filling tube. Further packaging casing material is withdrawn by the crimping shear 24. The neck 36 without filling, which has been extended in this way, is then sealed with two closure clips 38 and 40. This condition is represented in FIG. 3.

Upon sealing, the neck 36 is cut through between the two closure clips 38 and 40 by means of a cutting knife 42. As a result, the package just filled is sealed at both ends and separated from the remaining tubular packaging casing 10. The same is sealed—as desired—at its one end disposed before the filling tube orifice 14 and can be filled, as has already been described. The crimping shears 24 and 26 are moved back to their original position shown in FIG. 1. The cutting knife 42 is also swivelled back.

What is claimed is:

1. In a method for filling and sealing a tubular or bag-shaped casing packaging, in which a shirred tubular or bag-shaped casing is disposed about a filling tube having an orifice through which filling material is discharged, with one of said casing being disposed over said orifice and sealed and filling is discharged through the orifice of the filling tube into the tubular or bag-shaped packaging casing, causing a portion of the shirred casing to be unshirred and withdrawn from over the filling tube and filled, after which the withdrawn and filled portion of casing is sealed, the improvement which comprises sealing said filled casing by the steps of:

a) applying a compression force to a section over an entire width of said withdrawn casing adjacent to the filling tube to displace filling from said section;

b) withdrawing said compression force from said section; and then c) sealing said section with two closure clips d) crimping said section of casing by applying two crimping shears to said section at the moment the withdrawing of said compression force is completed, a first crimping shear being applied to said section of casing at a position adjacent the filling tube, and a second crimping shear being applied at a position adjacent the side of the first crimping shear that is farthest away from the filling tube;

e) displacing said second crimping shear away from said first crimping shear in a direction along a length of said filled casing to form a length of unfilled casing between said crimping shears; and wherein said sealing clips are applied to said length of unfilled casing between said crimping shears, and said crimping shears are then removed.

2. The method as claimed in claim 1 wherein additional casing material is withdrawn from a reservoir (18), while the casing (10) is compressed.

3. A sealing device for sealing tubular or bag-shaped casings which have been filled with a filling, comprising crimps (24, 26) and a clamp (28,30), said clamp being adapted to apply a compression force to a section across an entire width of said filled casing, squeeze filling out of said section of casing and then release said compression force, and said crimps being disposed adjacent to said clamp and adapted to crimp said section of said casing the moment has been applied and released from said section of said casing.

4. The sealing device as claimed in claim 3, wherein the clamp comprises squeezing skids or squeezing rollers (28, 30), which can be pressed onto the entire width of said filled casing.

5. The sealing device as claimed in claim 4, wherein said sealing device cooperates with a filling machine which introduces filling into the casing and the squeezing skids or rollers (28, 30) can be pressed onto the casing (10) between the filling machine and the crimps (24, 26).

* * * * *